United States Patent
Dowty et al.

(10) Patent No.: US 12,054,263 B2
(45) Date of Patent: Aug. 6, 2024

(54) PASSENGER POSITIONING DEVICES FOR AIRCRAFT SEATS FOR REGULATORY COMPLIANCE

(71) Applicant: B/E Aerospace, Inc., Winston-Salem, NC (US)

(72) Inventors: Mark B. Dowty, Rural Hall, NC (US); Tracy N. Pence, King, NC (US); Alen Wyss, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 219 days.

(21) Appl. No.: 17/576,653

(22) Filed: Jan. 14, 2022

(65) Prior Publication Data
US 2023/0227164 A1 Jul. 20, 2023

(51) Int. Cl.
*B64D 11/06* (2006.01)

(52) U.S. Cl.
CPC ........ *B64D 11/064* (2014.12); *B64D 11/0601* (2014.12); *B64D 11/0639* (2014.12)

(58) Field of Classification Search
CPC . B64D 11/06; B64D 11/0601; B64D 11/0619; B64D 11/06205; B64D 11/0639; B64D 11/064; B60N 2/00; B60N 2/02; B60N 2/24; B60N 2/42; B60N 2/914; B60N 2002/0204; B60N 2002/022
See application file for complete search history.

(56) References Cited

U.S. PATENT DOCUMENTS

| | | | |
|---|---|---|---|
| 3,924,613 A * | 12/1975 | Beck | A61F 5/01 601/149 |
| 4,059,909 A * | 11/1977 | Kron | B64D 11/0689 297/180.12 |
| 4,097,016 A | 6/1978 | Petrucci | |
| 4,671,572 A | 6/1987 | Young et al. | |
| 4,826,247 A | 5/1989 | McGrady et al. | |
| 4,936,620 A * | 6/1990 | Francois | B64D 11/00 244/118.6 |
| 5,599,065 A | 2/1997 | Gryp et al. | |

(Continued)

FOREIGN PATENT DOCUMENTS

| | | | |
|---|---|---|---|
| DE | 4209605 A1 * | 10/1992 | |
| DE | 19749780 C2 * | 1/2001 | B60N 2/4221 |

(Continued)

OTHER PUBLICATIONS

Extended European Search Report dated May 12, 2023; European Application No. 23151816.8.

*Primary Examiner* — Christopher D Hutchens
*Assistant Examiner* — Michael A. Fabula
(74) *Attorney, Agent, or Firm* — Suiter Swantz IP

(57) ABSTRACT

An aircraft passenger seat installable in an aircraft cabin at an angle relative to an aircraft longitudinal axis. The passenger seat includes movable or shape changing seat elements for temporarily re-indexing the passenger orientation according to at least one predetermined flight condition such that the seat assembly meets predefined regulatory certification criteria in at least one of the predetermined flight conditions. A method for effecting a temporary change in position of a seated passenger relative to the aircraft longitudinal axis (i.e., direction of flight) according to at least one predetermined flight condition.

15 Claims, 5 Drawing Sheets

(56) References Cited

U.S. PATENT DOCUMENTS

| | | | |
|---|---|---|---|
| 7,108,325 B2 | 9/2006 | Williamson et al. | |
| 9,457,751 B1* | 10/2016 | Stancato | B60N 2/42763 |
| 9,896,001 B1 | 2/2018 | Brodish | |
| 9,969,301 B2 | 5/2018 | Adam | |
| 10,370,108 B1* | 8/2019 | Williams | B64D 11/0606 |
| 10,471,850 B2* | 11/2019 | Lee | B60N 2/22 |
| 10,857,907 B2* | 12/2020 | Brodersen | A47C 3/18 |
| 10,889,380 B2 | 1/2021 | Mallette | |
| 11,045,379 B2 | 6/2021 | Yamauchi et al. | |
| 11,066,170 B2* | 7/2021 | Pozzi | B64D 11/00151 |
| 2003/0189370 A1 | 10/2003 | Hemmer et al. | |
| 2007/0284905 A1* | 12/2007 | Bailey | B60N 2/146 |
| | | | 296/65.07 |
| 2015/0008713 A1 | 1/2015 | Erhel | |
| 2015/0266448 A1* | 9/2015 | Aoki | B60N 2/688 |
| | | | 297/354.1 |
| 2016/0288752 A1* | 10/2016 | Stancato | B60R 21/01546 |
| 2017/0043681 A1* | 2/2017 | Seiller | B60N 2/002 |
| 2017/0080834 A1* | 3/2017 | Dry | B60N 2/7082 |
| 2017/0368968 A1* | 12/2017 | Shibata | B60N 2/914 |
| 2017/0368969 A1* | 12/2017 | Shibata | B60N 2/914 |
| 2018/0022246 A1* | 1/2018 | Patrick | B60N 2/02246 |
| | | | 297/284.3 |
| 2018/0072199 A1* | 3/2018 | Strumolo | B60N 2/99 |
| 2018/0086238 A1* | 3/2018 | Onuma | B60N 2/976 |
| 2018/0134181 A1* | 5/2018 | Ketels | B60N 2/22 |
| 2018/0170230 A1* | 6/2018 | Onuma | F04B 43/00 |
| 2018/0201375 A1* | 7/2018 | Browning | B64D 11/062 |
| 2018/0208080 A1* | 7/2018 | Hirayama | B60N 2/914 |
| 2018/0326881 A1* | 11/2018 | Patrick | B60N 2/914 |
| 2019/0176658 A1 | 6/2019 | Min et al. | |
| 2019/0233116 A1* | 8/2019 | Braca | B64D 11/0639 |
| 2019/0308525 A1* | 10/2019 | Riedel | B60N 2/02 |
| 2020/0062405 A1 | 2/2020 | Oleson | |
| 2020/0307797 A1* | 10/2020 | Henshaw | B64D 11/0606 |
| 2021/0001987 A1* | 1/2021 | Harcup | B64D 11/0605 |
| 2021/0101684 A1 | 4/2021 | Porter et al. | |
| 2021/0188441 A1* | 6/2021 | Lee | B64D 11/0601 |
| 2021/0188442 A1* | 6/2021 | Lee | B64D 11/0604 |
| 2021/0237631 A1* | 8/2021 | Muck | B60N 2/501 |
| 2022/0111965 A1* | 4/2022 | Carlioz | B64D 11/0604 |
| 2022/0281605 A1* | 9/2022 | Woodington | B64D 11/0606 |

FOREIGN PATENT DOCUMENTS

| | | | | |
|---|---|---|---|---|
| DE | 102016221508 A1 | 5/2018 | | |
| EP | 1401306 A1 | 3/2004 | | |
| EP | 2957459 A1 * | 12/2015 | | B60N 2/22 |
| GB | 2362095 A | 11/2001 | | |
| WO | 2021032954 A1 | 2/2021 | | |

* cited by examiner

PASSENGER POSITIONING DEVICES FOR AIRCRAFT SEATS FOR REGULATORY COMPLIANCE

TECHNICAL FIELD AND BACKGROUND

The present disclosure relates generally to aircraft passenger seats, and more particularly, to seat assemblies including integrated passenger positioning devices utilized to effect a temporary change in orientation of a seated passenger relative to the aircraft longitudinal axis (i.e., direction of flight).

Aircraft passenger seats must meet different regulatory certification criteria based, at least in part, on the TTOL installation angle relative to the aircraft longitudinal axis. Certification criteria exist for forward facing seats defined as having a seat longitudinal axis from 0-18° relative to the aircraft longitudinal axis, oblique seats defined as having a longitudinal axis from 18-45° relative to the aircraft longitudinal axis, and side-facing seats defined as having a seat longitudinal axis from 80-100° relative to the aircraft longitudinal axis. To maximize seat density and for privacy, it may be desirable in some cabin configurations to install seats at an angle that mandates unusual or even undefined criteria, for instance a seat longitudinal axis greater than 45° and less than 80° relative to the aircraft longitudinal axis.

In some seating arrangements, the installation angle may be close to one of the above-mentioned ranges. In that case, the seat would require certification criteria different from the certification criteria of the closest range. For example, a seat having a TTOL installation angle of 49° would be subject to different regulatory certification criteria as compared to a seat having a TTOL installation angle of 45°. To enjoy the advantages of the closest installation angle range in terms of known criteria, weight, cost, safety, etc., it would be desirable to design a seat with adjustability to change the passenger orientation during TTOL versus other flight modes, or vice versa. Such adjustability would meet TTOL compliance while providing increased density and comfort advantages during flight.

While solutions for adjusting a seat angle relative to the longitudinal aircraft axis are known, they include some form of device to swivel the entire seat including its supporting frame. Such devices tend to be complex, costly and add unwanted weight, and importantly require clearance around the seat to allow for rotational movement.

Therefore, what is desired are devices for providing a subtle and refined change in the passenger orientation without having to manipulate the entire seat.

SUMMARY OF THE INVENTIVE ASPECTS

To achieve the foregoing and other advantages, the inventive aspects disclosed herein are broadly directed to seat assemblies including devices configured to effect a change in a seat element to change passenger position or orientation relative to the aircraft longitudinal axis and according to at least one predetermined flight condition. For example, a seat assembly according to the present disclosure may be installed at a predetermined angle relative to an aircraft longitudinal axis, and seat elements of the seat assembly may be configured to change in shape and/or position to change the passenger position for compliance with a predefined regulatory certification. Benefits of the present disclosure include, but are not limited to, compliance with TTOL certification criteria with the ability to change the passenger position during flight.

In a first embodiment, the present disclosure provides an aircraft passenger seat installable in an aircraft cabin at an angle relative to an aircraft longitudinal axis. The aircraft passenger seat includes a backrest including a first device configured to effect a change in the backrest to change an angle of a seated passenger relative to the aircraft longitudinal axis, a seat bottom including a second device configured to effect a change in the seat bottom to change an angle of the seated passenger relative to the aircraft longitudinal axis, and a controller communicatively coupled to each of the first and second devices, the controller configured to actuate the first and second devices according to at least one aircraft flight condition.

In some embodiments, in a taxi, takeoff and landing (TTOL) aircraft flight condition, the backrest and the seat bottom are shaped to position the seated passenger at a first angle relative to the aircraft longitudinal axis, and in a non-TTOL aircraft flight condition, the controller is configured to actuate each of the first and second devices to effect the change in the respective backrest and the seat bottom to position the seated passenger at a second angle relative to the aircraft longitudinal axis, wherein the second angle is greater than the first angle.

In some embodiments, the first device is a first air bladder incorporated within or positioned in relation to the backrest and configured to be inflated to change the shape of the backrest to position the seated passenger at the first angle and configured to be deflated to change the shape of the backrest to position the seated passenger at the second angle. The second device is a second air bladder incorporated within or positioned in relation to the seat bottom and configured to be inflated to change the shape of the seat bottom to position the seated passenger at the first angle and configured to be deflated to change the shape of the seat bottom to position the seated passenger at the second angle. The controller is configured to cause each of the first and second air bladders to be inflated in preparation for or responsive to the TTOL aircraft flight condition and each of the bladders to be deflated in preparation for or responsive to the non-TTOL flight condition.

In some embodiments, inflating the first air bladder causes forward movement of one side of the backrest and inflating the second air bladder causes forward movement of one side of the forward end of the seat bottom.

In some embodiments, each of the first and second air bladders are wedge-shaped such that inflation causes re-indexing of the seated passenger for TTOL and deflation causes re-indexing of the seated passenger for flight.

In some embodiments, the first device is a first actuator positioned in relation to the backrest and configured to move one side of the backrest forward to position the seated passenger at the first angle and configured to move the one side of the backrest rearward to position the seated passenger at the second angle. The second device is a second actuator positioned in relation to the seat bottom and configured to move one side of a forward end of the bottom forward to position the seated passenger at the first angle and configured to move the one side of the forward end rearward to position the seated passenger at the second angle.

In some embodiments, a first condition of the aircraft passenger seat corresponds to a TTOL-compliant seat angle in which the angle of the seated passenger, determined by the backrest and the seat bottom, is 45° or less relative to the aircraft longitudinal axis, and a second condition of the aircraft passenger seat corresponds to a TTOL-non-compliant seat angle in which the angle of the seated passenger, determined by the backrest and the seat bottom, is greater than 45° relative to the aircraft longitudinal axis.

In some embodiments, actuation of the first and second devices is coordinated by the controller, a first condition of each of the first and second devices corresponds to a taxi, takeoff, and landing (TTOL) condition of the aircraft passenger seat, and a second condition of each of the first and second devices corresponds to a flight condition of the aircraft passenger seat.

In some embodiments, the first device is coupled to the backrest and extends in a vertical direction of the backrest such that rotation of the first device effects rotational movement of the backrest to decrease the angle of the backrest relative to the aircraft longitudinal axis, the second device is coupled to the seat bottom and is rotatable about a vertical axis such that rotation of the second device effects rotational movement of the seat bottom to decrease an angle of a forward end of the seat bottom relative to the aircraft longitudinal axis, and rotation of the first and second devices is coordinated.

In some embodiments, the seat assembly further includes a passenger restraint including first and second attachment points asymmetrically positioned on opposite sides of the seat bottom.

In some embodiments, the seat assembly further includes a frame supporting each of the backrest and the seat bottom, wherein the frame is rotationally fixed about a vertical axis of the frame.

In another aspect, the present disclosure provides a method for effecting a temporary position change of a seated passenger relative to an aircraft longitudinal axis. The method includes providing a seat assembly according to the above, positioning the seat assembly in an aircraft cabin at an angle relative to the aircraft longitudinal axis, and actuating the first and second devices via a command from the controller to cause a position change of the seated passenger according to at least one aircraft flight condition.

In some embodiments, the at least one aircraft flight condition includes a taxi, takeoff and landing (TTOL) compliant condition in which the seat angle, determined by the backrest and the seat bottom, is 45° or less relative to the aircraft longitudinal axis, and a flight condition in which the seat angle, determined by the backrest and the seat bottom, is greater than 45° relative to the aircraft longitudinal axis.

In some embodiments, a default condition of the seat assembly corresponds to the TTOL compliant condition, and the controller is configured to actuate the first and second devices to re-index the seated passenger to a temporary condition of the seat assembly which corresponds to the flight condition.

In some embodiments, each of the first and second devices is an air bladder configured to deflate, via a command from the controller, to position the seat assembly in the flight condition.

In some embodiments, the seat assembly further includes a passenger restraint including first and second attachment points asymmetrically positioned on opposite sides of the seat bottom.

BRIEF DESCRIPTION OF THE DRAWINGS

Implementations of the inventive concepts disclosed herein may be better understood when consideration is given to the following detailed description thereof. Such description refers to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings.

DETAILED DESCRIPTION

Figure 1:
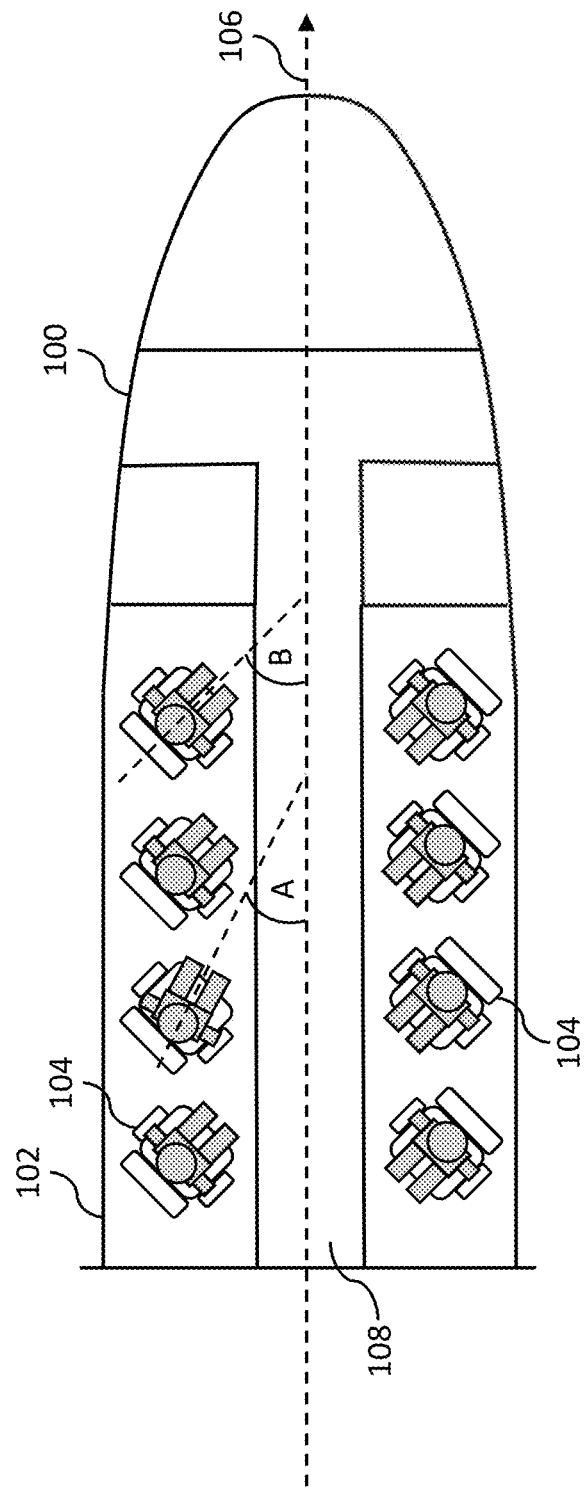
FIG. 1 is a schematic diagram showing a passenger seat assembly according to the present disclosure positioned in a cabin of an aircraft having an aircraft longitudinal axis (i.e., direction of flight)

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly speaking, embodiments of the inventive concepts disclosed herein are directed to passenger seat assemblies including devices configured to change the passenger position (i.e., angle) relative to the aircraft longitudinal axis and according to predetermined flight conditions.

Referring to FIG. 1, a passenger aircraft 100 includes a passenger cabin 102 in which a plurality of passenger seats 104 are positioned. The aircraft 100 defines an aircraft longitudinal axis 106 corresponding to the direction of flight. In most passenger aircraft, at least one longitudinal aisle 108 is parallel to the aircraft longitudinal axis 106. In narrowbody aircraft, a central aisle (as shown) typically divides the cabin into spaced left and right columns. In widebody aircraft, two longitudinal aisles separate the cabin into left, right and center columns. According to the present disclosure, at least one of the passenger seats 104 positioned in the cabin is provided at an angle relative to the aircraft longitudinal axis 106. The at least one passenger seat 104 is alterable to change the angle of the seated passenger relative to the aircraft longitudinal axis 106 according to the aircraft flight condition. As shown, and discussed further below, angle "A" corresponds to a TTOL aircraft condition in which a TTOL certification criteria applies, and angle "B" corresponds to at least one flight condition in which the TTOL certification criteria does not apply, wherein angle "B" is greater than angle "A".

As discussed above in the background section, passenger seat angles from 0-18° are classified as forward facing, seat angles from 18-45° are classified as oblique facing, and seat angles from 80-100° are classified as side facing. Each classification is subject to different regulatory criteria. The same applies to aft facing seats +180° of the angular ranges. Presently, no regulatory certification criteria exist for seat angles greater than 45° and less than 80°. As such, the present disclosure provides seat assemblies in which the seat angle can be changed temporarily during flight, or temporarily changed for TTOL, such that the seat meets certification criteria for its TTOL position.

For example, a seat assembly according to the present disclosure may have a first flight configuration for positioning a seated passenger outside of the predefined classifications, for example at an angle in the range from 46-50° relative to the aircraft longitudinal axis 106, and a second TTOL configuration for positioning a seated passenger within a predefined classification, for example at an angle of 45° or less relative to the aircraft longitudinal axis 106. In this example, the seat assembly would meet the certification criteria for the TTOL position while providing the ability to reposition the seated passenger during flight where no certification criteria apply. In other words, devices incorporated into the seat assembly are utilized to cause the seat angle to change, thereby changing the angle of the seated passenger, between TTOL and at least one flight condition of the aircraft, such that the seat TTOL angle meets the regulatory certification criteria for an oblique facing seat. In other applications, the devices according to the present disclosure can be utilized to change the passenger orientation for reasons other than meeting certification criteria.

Figure 2:
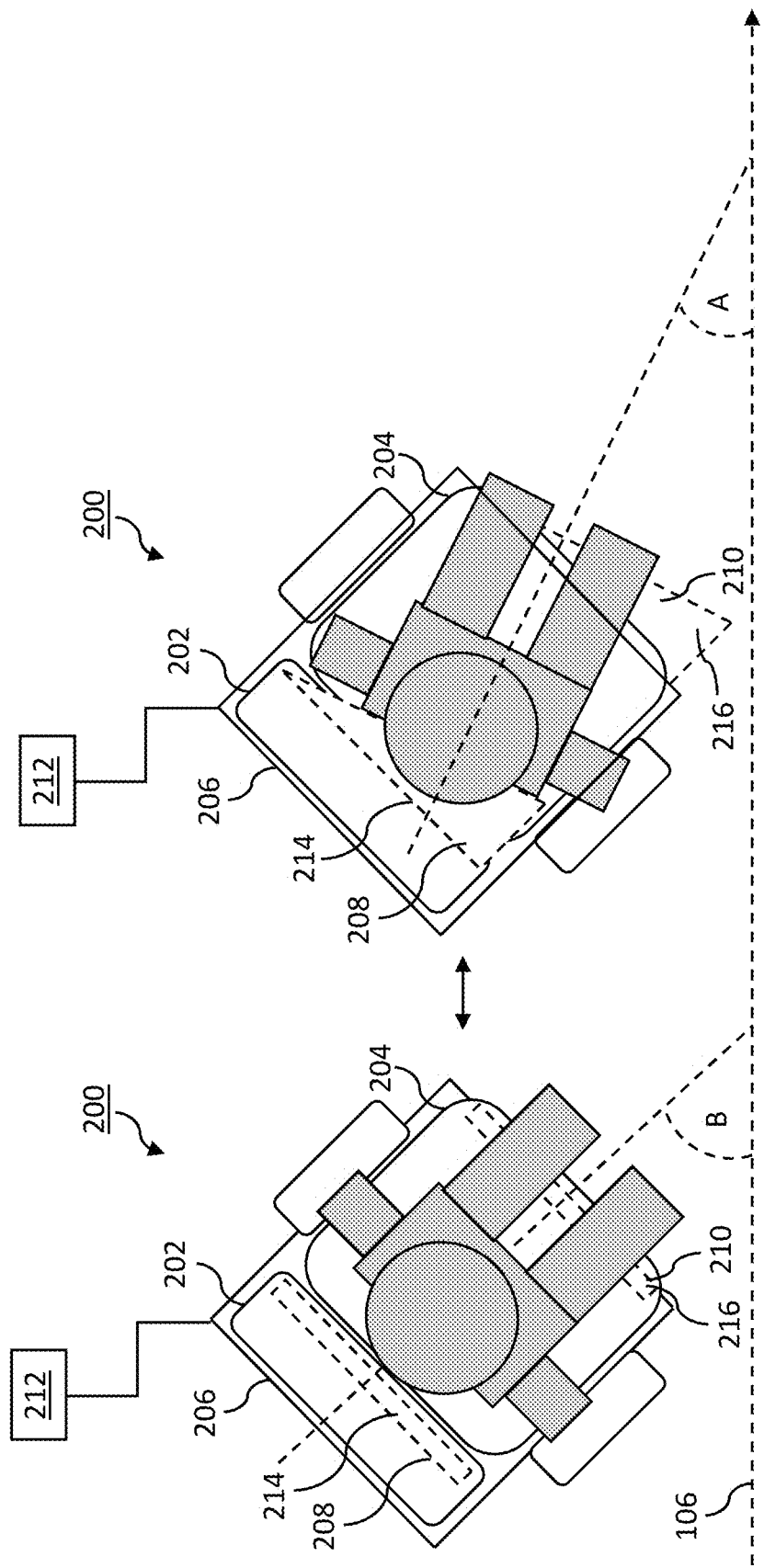
FIG. 2 is a schematic diagram showing a seat assembly equipped with backrest and seat bottom air bladders utilized during TTOL to effect a temporary change in orientation of a passenger relative to the aircraft longitudinal axis.

Referring to FIG. 2, a seat assembly 200 according to the present disclosure includes a backrest 202 and a seat bottom 204 supported on a frame 206. The frame 206 is rotationally fixed about its vertical axis such that the seat frame does not pivot or rotate to change the seat angle relative to the aircraft longitudinal axis 106. The seat frame may be configured to recline to transition between upright sitting, reclined and lie-flat sleeping positions, among other intermediate positions. The devices for effecting a change in a seat element discussed herein are compatible for use with seat adjustment devices such as seat recline and armrest adjustment mechanisms, among others. Although not shown, the seat assembly may include a leg rest, armrests and other seat elements typically found on business class seats and the like.

Factors that influence the seated passenger angle relative to the seat frame 206 and the aircraft longitudinal axis include the back angle (measured in the z-axis) in relation to the lateral sides of the backrest cushion, and the angle of the leading or forward edge of the seat bottom cushion in relation to the lateral sides of the seat bottom cushion. As discussed below, other factors that influence the seat angle of a passenger relative to the seat itself include the offset/asymmetric location of the seat belt attachment points as well as visual cues (i.e., items positioned directly forward of the seated passenger intended to capture the passenger's focus and attention, such as a video monitor, causing the passenger to face an intended direction).

The backrest 202 is equipped with a first device 208, incorporated within or positioned relative to the backrest 202, configured to effect movement of the backrest to change the angle of the backrest (measured in the z-axis) relative to the aircraft longitudinal axis. The seat bottom 204 includes a second device 210, incorporated within or positioned relative to the seat bottom 204, configured to effect movement of the seat bottom to change the angle of the seat bottom relative to the aircraft longitudinal axis. A controller 212 communicatively coupled to each of the first and second devices 208, 210, such as through an air compressor having a bleed valve, is configured to activate, such as actuate, the first and second devices according to the aircraft flight condition.

In some embodiments, the change effected in each of the backrest 202 and the seat bottom 204 is a shape change of the seat element. For example, the backrest 202 may include an air bladder 214 incorporated within the backrest configured to inflate to change the backrest shape thereby changing the backrest angle and consequently the angle of the seated passenger relative to the aircraft longitudinal axis. The air bladder 214 may be positioned within the backrest 202 along one lateral side and extending in the vertical direction. In use, the air bladder 214 inflates to expand one side of the backrest causing the one side to move farther forward as compared to the opposing side, thus decreasing the angle of the backrest relative to the aircraft longitudinal axis to change the backrest angle from, for example, greater than 45° to 45° or less. The air bladder 214 may be wedge-shaped such that inflation fills the bladder to drive one side of the backrest forward. In other embodiments, the air bladder may be in contact with the backside of the backrest such that inflation causes the backrest to rotate or pivot such that one side of the backrest is driven forward relative to the other. In the reverse, deflating one of the air bladder configurations returns the backrest to the original position.

The seat bottom 204 also includes an air bladder 216 that inflates to drive one side of the forward end forward relative to the opposing side to change the angle of the forward end supporting the legs of the passenger. The air bladder 216 may be wedge shaped such that inflating the air bladder 216 extends one side of the front of the seat bottom farther forward to decrease the angle of the seat bottom, measured at the forward end relative to the aircraft longitudinal axis. In the reverse, deflating the air bladder 216 returns the shape to the original position, for example, from 45° or less to greater than 45°.

In some embodiments, the inflated conditions of the air bladders 214, 216 corresponds to the TTOL position of the seat assembly, and the deflated conditions of the air bladders 214, 216 corresponds to an aircraft flight condition, such as any flight condition other than TTOL in which certification criteria do not apply. In some embodiments, the air bladders 214, 216 may inflate or deflate to change the seat angle, and consequently the seated passenger angle, from one classification to another, such as from forward facing to oblique facing and vice versa.

The controller 212 may be located within or remote from the seat and functions to coordinate the inflation and deflation of the air bladders 214, 216. For example, during flight, the controller 212 may cause the air bladders 214, 216 to deflate to effect the angular change in the seat elements to change the seat angle of the passenger, and when preparing for TTOL the controller 212 may cause the air bladders 214, 216 to inflate change the seat angle for TTOL compliance. The default configuration may be the TTOL condition in which the air bladders 214, 216 are inflated, whereas the temporary confirmation may be the flight condition in which the air bladders 214, 216 are deflated, or vice versa. In other words, a default condition of the seat assembly meeting a certification criterion may be changed to a temporary condition of the seat assembly in which certification criteria does not apply, or vice versa.

Figure 3:
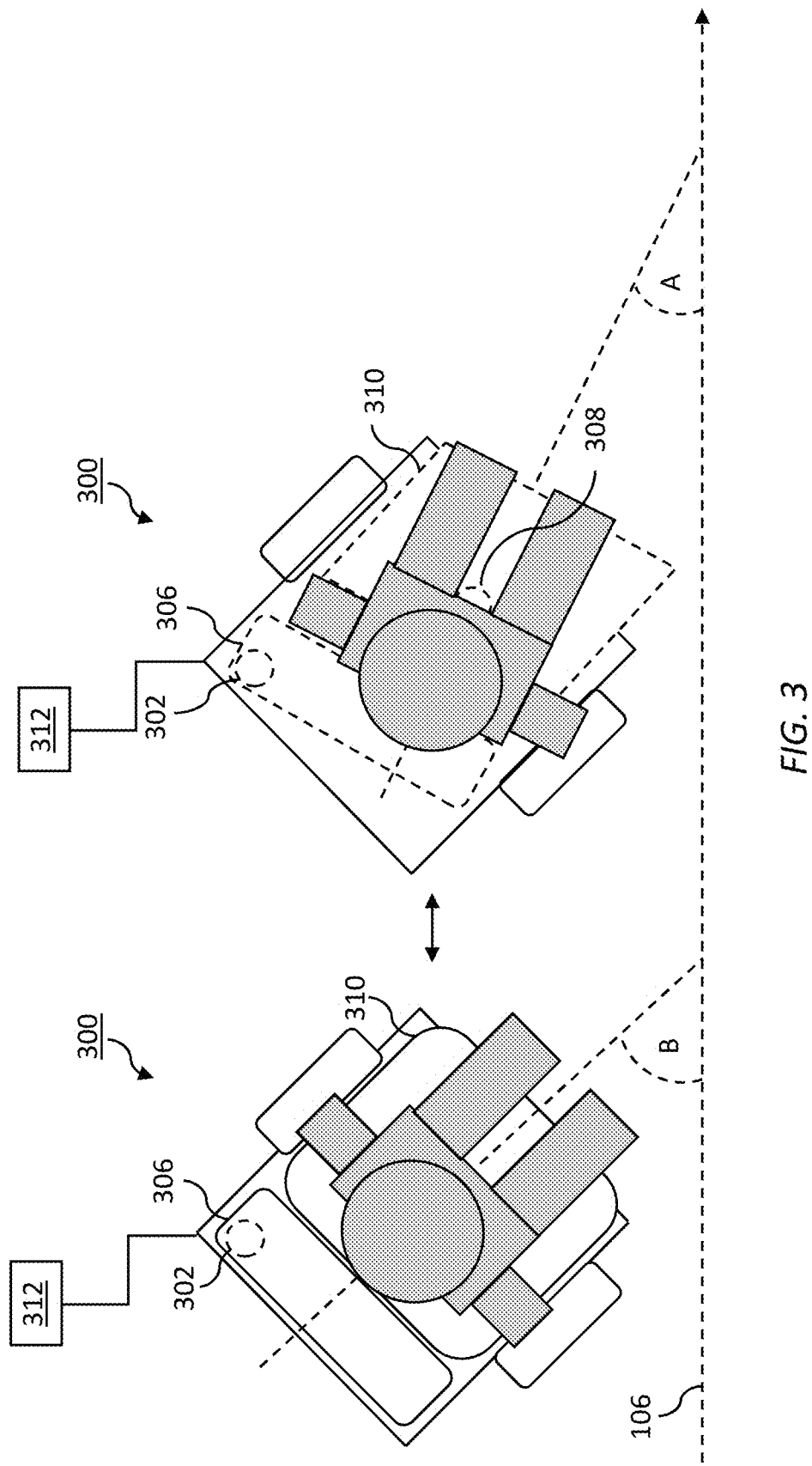
FIG. 3 is a schematic diagram showing a seat assembly equipped with rotational devices coupled to the backrest and seat bottom for rotating the respective seat elements to achieve different angles during TTOL versus other modes of flight.

Referring to FIG. 3, in another embodiment of a seat assembly 300, the first device 302 may be a mechanical actuator or linkage coupled to the backrest 306 and extending in a vertical direction of the backrest such that rotation of the actuator alters the backrest angle. In some embodiments, via the controller 312, rotation of the actuator in a first direction rotates or pivots the backrest 306 to decrease the angle of the backrest relative to the aircraft longitudinal axis for TTOL, while rotation of the actuator in a second direction opposite the first direction rotates or pivots the backrest 306 to increase the angle of the backrest relative to the aircraft longitudinal axis for the at least one flight condition. The second device 308 may be coupled to the seat bottom 310 such that rotation of the second device about a vertical axis causes rotational movement of the seat bottom to change the angle of the forward end of the seat bottom relative to the aircraft longitudinal axis. Other devices and mechanisms are envisioned to move the seat elements and/or effect a shape change, and the first and second devices may be coordinated for simultaneous movement via the controller 310.

Figure 4:
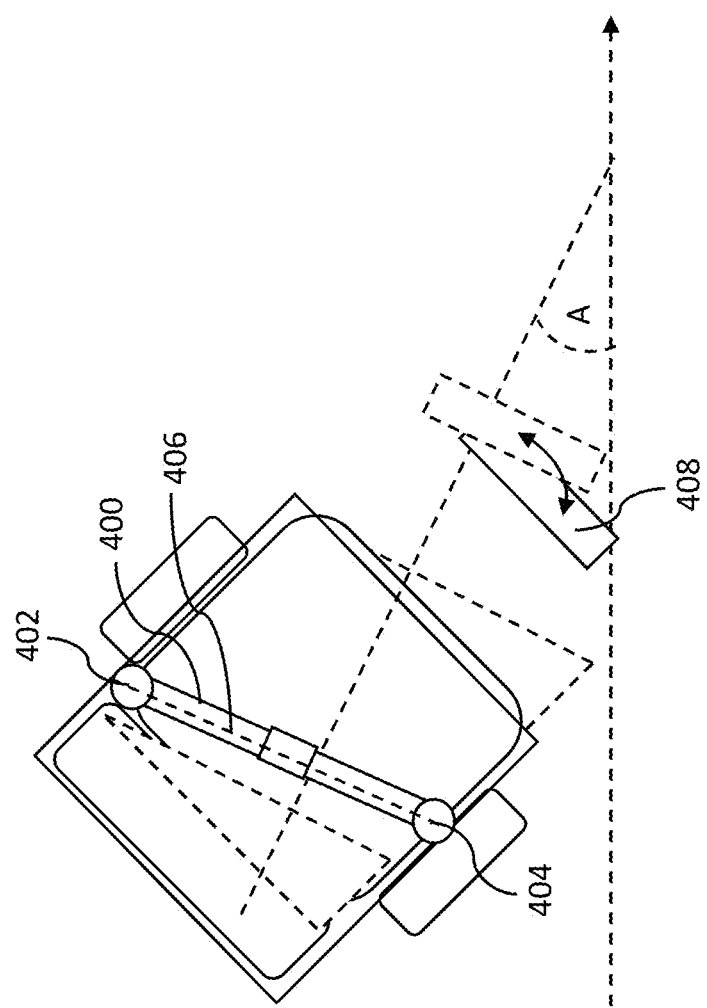
FIG. 4 is a schematic diagram showing a passenger restraint and visual cue associated with the seat assembly according to the present disclosure.

Referring to FIG. 4, in each of the above-described seat assemblies, the seat assembly further includes a passenger restraint 400 including first and second attachment points 402, 404 positioned on opposite sides of the seat bottom in an asymmetrical relationship. To further influence the seated passenger angle relative to the seat elements and to the aircraft longitudinal axis, the two attachment points are asymmetrically positioned such that one attachment point is positioned farther forward along the seat bottom as compared to the other. The attachment points are fixed in position such that a line 406 drawn connecting the points is parallel to the plane of the backrest and the plane of the forward end of the seat bottom when configured for TTOL. In other words, the passenger restraint is aligned according to the seat certification criteria for the TTOL altered seat, and not for other modes of flight, as impact loads are necessitated for TTOL positions. Passenger restraints can include, but are not limited to, conventional lap belts with or without over-shoulder straps. In addition, should other load cases dictate, attachment points may be infinitely positioned or indexed to either a TTOL and flight positions using a mechanical or electromechanical device.

Still reference to FIG. 4, the passenger seat assembly according to the present disclosure may be positioned in relation to a visual cue 408 provided forward of the seat to further help position the seated passenger in relation to the seat and to the aircraft longitudinal axis. In other words, the visual cue functions to ensure that the seated passenger is correctly seated on the altered seat with his/her back against the backrest and legs against the forward end of the seat bottom for TTOL. The visual cue can take the form of a physical object that directs or instructs the passenger toward the "correct" orientation angle, for example, a video monitor, placarding, footrest locations and shapes, visual indicators, line features, etc. In some embodiments, the visual cue may be movable and the movement coordinated with the altering of the seat assembly to capture the focus of the seated passenger.

Figure 5:
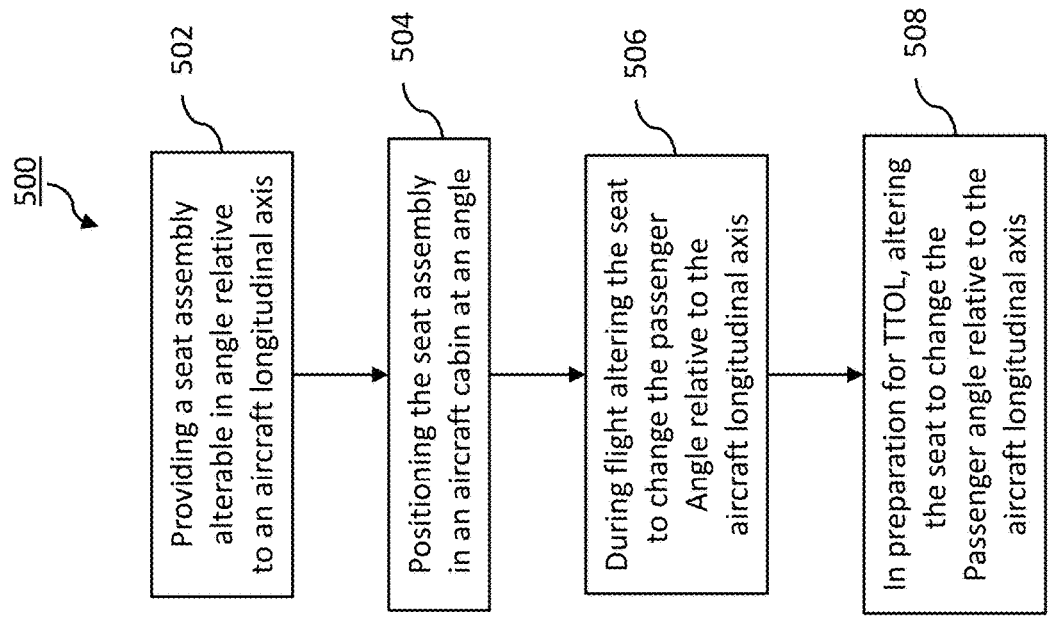
FIG. 5 is a flowchart showing a method for effecting a temporary change in orientation of a passenger relative to the aircraft longitudinal axis during TTOL.

Referring to FIG. 5, a method 500 for temporarily changing the seat angle to effect a temporary change in orientation of a seated passenger relative to an aircraft longitudinal axis includes, in a first Step 502, providing a seat assembly according to one of the seat assembly embodiments described above. In a Step 504, the seat assembly is positioned in an aircraft cabin at an angle relative to the aircraft longitudinal axis. The seat elements, such as the backrest and the seat bottom, are positioned or shaped for TTOL such that the seat assembly certification criteria are met.

Continuing with the method, in a Step 506, during flight (i.e., any flight condition other than TTOL) the controller functions to actuate the seat devices to alter the seat elements to achieve the second angle relative to the aircraft longitudinal axis. The second angle corresponds to the aircraft flight condition for which no seat certification criteria apply, or in which seat certification criteria other than TTOL apply. In a Step 508, in preparation for or in response to the TTOL aircraft flight condition, the controller causes the seat devices to actuate to return the seat elements to their first angle for TTOL.

Altering between the first and second angles, or in an out of applicable certification criteria, may be manual or automatic, passenger and/or crew controlled, etc. In addition to the alterable elements discussed herein, similar devices may be applied to leg rests, position adjustable armrests, headrests, etc. when included on the seat assembly.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. An aircraft passenger seat installed in an aircraft cabin at an offset angle relative to a vertical plane along an aircraft longitudinal axis, the aircraft passenger seat comprising:
a backrest comprising a first device configured to effect a change in the backrest to change an angle of a seated passenger relative to the aircraft longitudinal axis, the change in the backrest including movement of one side of a front of the backrest relative to an opposing side of the front of the backrest to change an angle of the front of the backrest relative to the vertical plane along the aircraft longitudinal axis;
a seat bottom including a second device configured to effect a change in the seat bottom to change an angle of the seated passenger relative to the aircraft longitudinal axis, the change in the seat bottom including movement of one side of a forward end of the seat bottom relative to an opposing side of the forward end of the seat bottom to change an angle of the forward end of the seat bottom relative to the vertical plane along the aircraft longitudinal axis; and
a controller communicatively coupled to each of the first and second devices, the controller configured to actuate the first and second devices according to at least one aircraft flight condition.

2. The aircraft passenger seat according to claim 1, wherein:
in a taxi, takeoff, and landing (TTOL) aircraft flight condition, the backrest and the seat bottom are shaped to position the seated passenger at a first angle relative to the vertical plane along the aircraft longitudinal axis; and
in a non-TTOL aircraft flight condition, the controller is configured to actuate each of the first and second devices to effect the change in the respective backrest and the seat bottom to position the seated passenger at a second angle relative to the vertical plane along the aircraft longitudinal axis;
wherein the second angle is greater than the first angle.

3. The aircraft passenger seat according to claim 2, wherein:
the first device is a first air bladder, incorporated within or positioned in relation to the backrest, configured to be inflated to change the shape of the backrest to position the seated passenger at the first angle, and configured to be deflated to change the shape of the backrest to position the seated passenger at the second angle;
the second device is a second air bladder, incorporated within or positioned in relation to the seat bottom, configured to be inflated to change the shape of the seat bottom to position the seated passenger at the first angle, and configured to be deflated to change the shape of the seat bottom to position the seated passenger at the second angle; and
the controller is configured to cause each of the first and second air bladders to be inflated in preparation for or responsive to the TTOL aircraft flight condition and each of the bladders to be deflated in preparation for or responsive to the non- TTOL flight condition.

4. The aircraft passenger seat according to claim 3, wherein:
inflating the first air bladder causes forward movement of one side of the backrest; and
inflating the second air bladder causes forward movement of one side of the forward end of the seat bottom.

5. The aircraft passenger seat according to claim 3, wherein each of the first and second air bladders are wedge-shaped such that inflation causes re-indexing of the seated passenger for TTOL and deflation causes re-indexing of the seated passenger for flight.

6. The aircraft passenger seat according to claim 2, wherein:
the first device is a first actuator, positioned in relation to the backrest, configured to move one side of the backrest forward to position the seated passenger at the first angle, and configured to move the one side of the backrest rearward to position the seated passenger at the second angle; and
the second device is a second actuator, positioned in relation to the seat bottom, configured to move one side of a forward end of the bottom forward to position the seated passenger at the first angle, and configured to move the one side of the forward end rearward to position the seated passenger at the second angle.

7. The aircraft passenger seat according to claim 1, wherein:
a first condition of the aircraft passenger seat corresponds to a TTOL-compliant seat angle in which the angle of the seated passenger, determined by the backrest and the seat bottom, is 45° or relative to the vertical plane along the aircraft longitudinal axis; and
a second condition of the aircraft passenger seat corresponds to a TTOL-non-compliant seat angle in which the angle of the seated passenger, determined by the backrest and the seat bottom, is greater than 45° relative to the vertical plane along the aircraft longitudinal axis.

8. The aircraft passenger seat according to claim 1, wherein:
actuation of the first and second devices is coordinated by the controller;
a first condition of each of the first and second devices corresponds to a taxi, takeoff and landing (TTOL) condition of the aircraft passenger seat; and
a second condition of each of the first and second devices corresponds to a flight condition of the aircraft passenger seat.

9. The aircraft passenger seat according to claim 1, wherein:
the first device is coupled to the backrest and extends in a vertical direction of the backrest, wherein rotation of the first device effects rotational movement of the backrest to decrease the angle of the backrest relative to the vertical plane along the aircraft longitudinal axis;
the second device is coupled to the seat bottom and is rotatable about a vertical axis such that rotation of the second device effects rotational movement of the seat bottom to decrease an angle of a forward end of the seat bottom relative to the vertical plane along the aircraft longitudinal axis; and
rotation of the first and second devices is coordinated.

10. The aircraft passenger seat according to claim 1, further comprising a passenger restraint including first and second attachment points asymmetrically positioned on opposite sides of the seat bottom.

11. The aircraft passenger seat according to claim 1, further comprising a frame supporting each of the backrest and the seat bottom, wherein the frame is rotationally fixed about a vertical axis of the frame.

12. A method for effecting a temporary position change of a seated passenger relative to a vertical plane along an aircraft longitudinal axis, comprising the steps of:
providing a seat assembly comprising:
a backrest comprising a first device configured to effect a change in the backrest to change an angle of a seated passenger relative to the aircraft longitudinal axis, the change in the backrest including movement of one side of a front of the backrest relative to an opposing side of the front of the backrest to change an angle of the front of the backrest relative to the vertical plane along the aircraft longitudinal axis;
a seat bottom including a second device configured to effect a change in the seat bottom to change an angle of the seated passenger relative to the aircraft longitudinal axis, the change in the seat bottom including movement of one side of a forward end of the seat bottom relative to an opposing side of the forward end of the seat bottom to change an angle of the forward end of the seat bottom relative to the vertical plane along the aircraft longitudinal axis; and a controller communicatively coupled to each of the first and second devices, the controller configured to actuate the first and second devices according to at least one aircraft flight condition;

positioning the seat assembly in an aircraft cabin at an offset angle relative to the vertical plane along the aircraft longitudinal axis; and actuating, via the controller, the first and second devices to effect a position change of the seated passenger according to the at least one aircraft flight condition.

13. The method according to claim 12, wherein:

the at least one aircraft flight condition includes a taxi, takeoff and landing (TTOL) compliant condition in which the seat angle, determined by the backrest and the seat bottom, is 45° or less relative to the vertical plane along the aircraft longitudinal axis;

the at least one aircraft flight condition includes a flight condition in which the seat angle, determined by the backrest and the seat bottom, is greater than 45° relative to the vertical plane along the aircraft longitudinal axis; and a default condition of the seat assembly corresponds to the TTOL compliant condition and the controller is configured to actuate the first and second devices to re-index the seated passenger to a temporary condition of the seat assembly which corresponds to the flight condition.

14. The method according to claim 13, wherein each of the first and second devices is an air bladder configured to inflate, via a command from the controller, to position the seat assembly in the TTOL compliant condition, and configured to deflate, via a command from the controller, to position the seat assembly in the flight condition.

15. The method according to claim 12, wherein the seat assembly further comprises a passenger restraint including first and second attachment points asymmetrically positioned on opposite sides of the seat bottom.

* * * * *